United States Patent [19]

Magnuson

[11] Patent Number: 4,506,335

[45] Date of Patent: Mar. 19, 1985

[54] MANIPULATOR WITH CONTROLLED PATH MOTION

[75] Inventor: Timothy J. Magnuson, Tyler, Tex.

[73] Assignee: Cincinnati Milacron Inc., Cincinnati, Ohio

[21] Appl. No.: 387,233

[22] Filed: Jun. 10, 1982

[51] Int. Cl.³ .............................................. G06F 15/46
[52] U.S. Cl. ..................................... 364/513; 364/169;
364/174; 318/571; 318/574; 901/20
[58] Field of Search ............... 364/169, 174, 513, 474,
364/475, 168, 167, 170, 175; 318/571, 573, 574;
901/20, 17, 16

[56] References Cited

U.S. PATENT DOCUMENTS

| 3,699,317 | 10/1972 | Middlestitch | 364/168 |
|---|---|---|---|
| 3,727,191 | 4/1973 | McGee | 364/169 |
| 3,757,095 | 9/1973 | Kiwiet | 364/169 |
| 3,798,427 | 3/1974 | Conners | 364/169 |
| 3,893,616 | 7/1975 | Trousdale | 318/571 |
| 3,908,195 | 9/1975 | Leenhouts | 364/174 |
| 3,909,600 | 9/1975 | Hohn | 364/300 |
| 3,920,972 | 11/1975 | Corwin, Jr. et al. | 364/193 |
| 3,941,987 | 3/1976 | Tack, Jr. | 364/174 |
| 3,979,653 | 9/1976 | Cutler | 318/571 |
| 4,287,461 | 9/1981 | Promis et al. | 318/571 |
| 4,334,281 | 6/1982 | Imazeki et al. | 318/573 |
| 4,342,378 | 8/1982 | Humelovsky | 318/561 |
| 4,348,731 | 9/1982 | Kogawa | 901/20 |
| 4,453,221 | 6/1984 | Davis et al. | 364/513 |

Primary Examiner—Charles E. Atkinson
Assistant Examiner—John R. Lastova
Attorney, Agent, or Firm—John W. Gregg

[57] ABSTRACT

An articulated manipulator and control are provided for producing controlled motion of a function element carried by the manipulator. The motion is defined by input signals specifying with respect to a rectangular coordinate system the positions and path velocities therebetween of a tool centerpoint associated with the function element. The control interpolates intermediate points along a predetermined path between any two positions. The intermediate points are produced in accordance with a fixed period interval and incremental velocity values instantaneously variable with each interval. Continuous functions of acceleration and deceleration are produced to vary the velocity in accordance with the programmed description of motion. Further velocity adjustment is permitted in accordance with unprogrammed variations of a preselected parameter.

3 Claims, 14 Drawing Figures

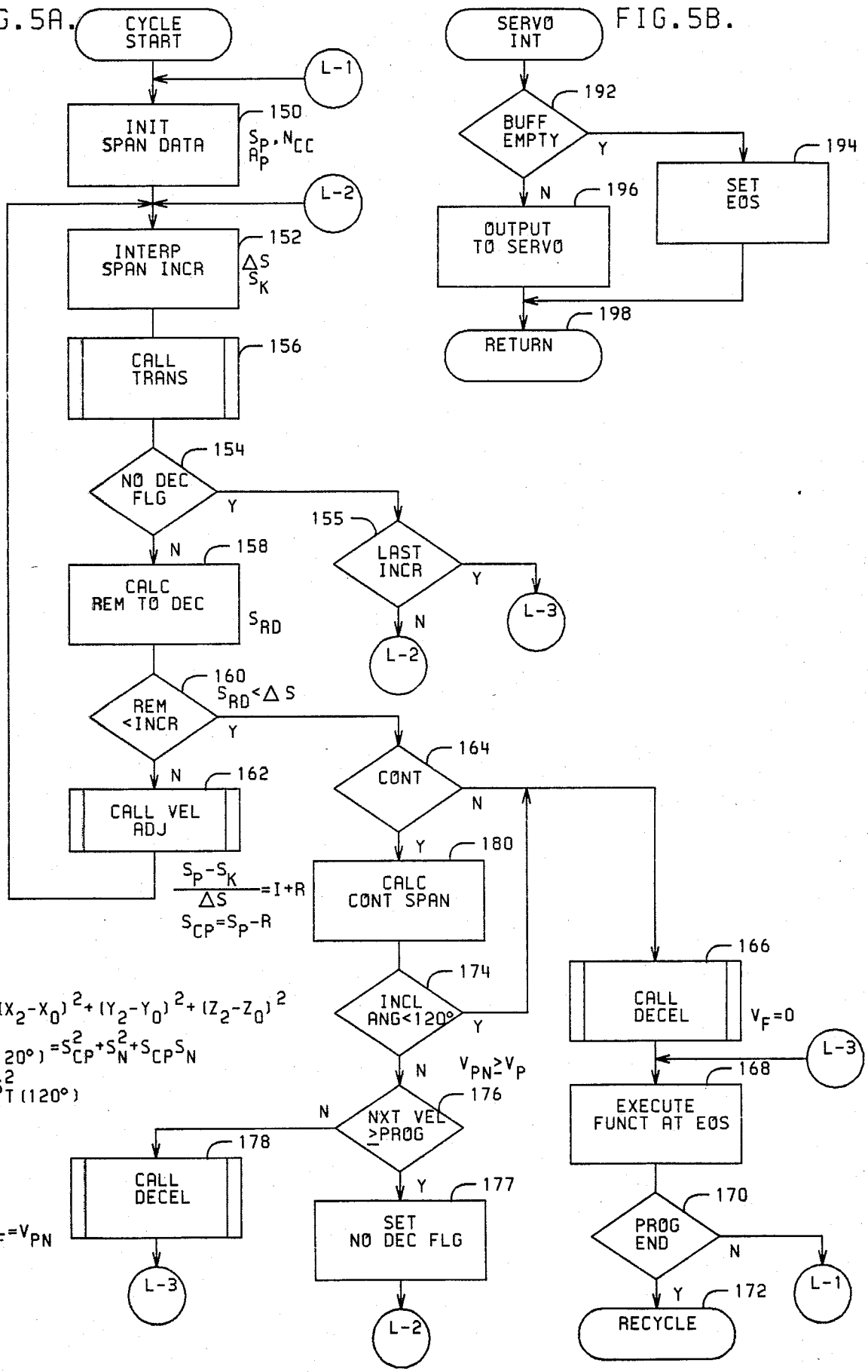

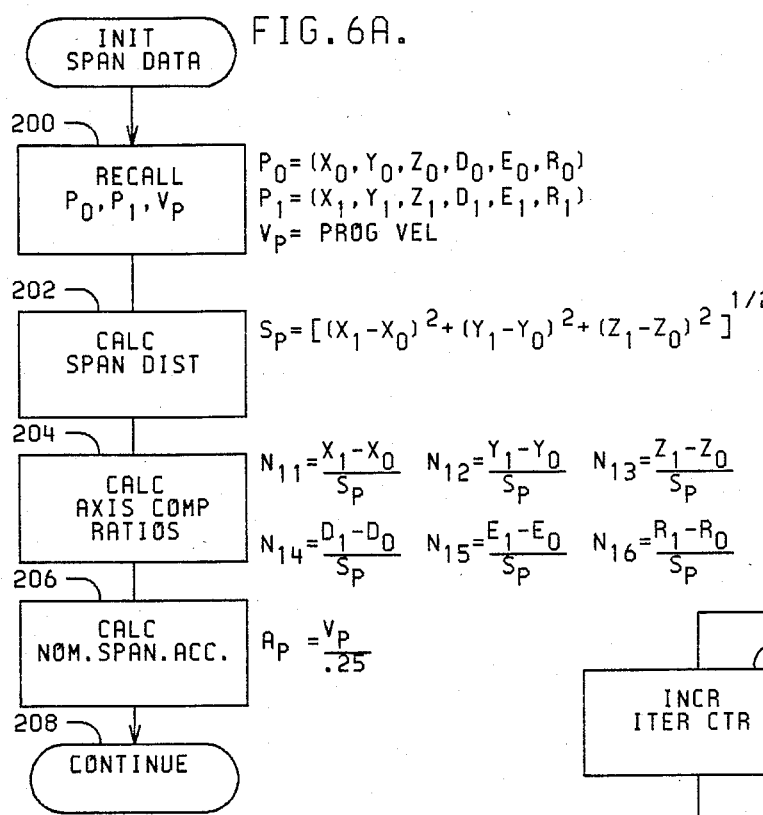
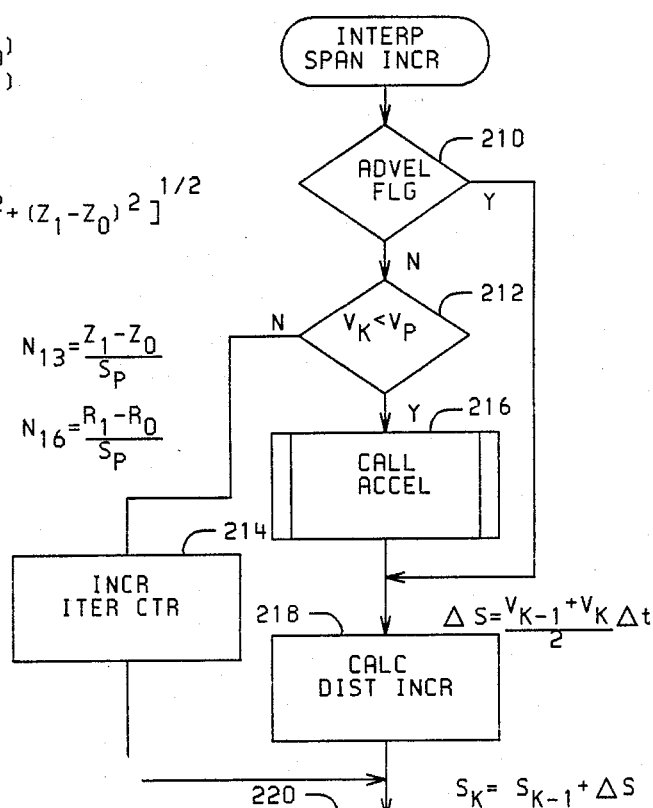
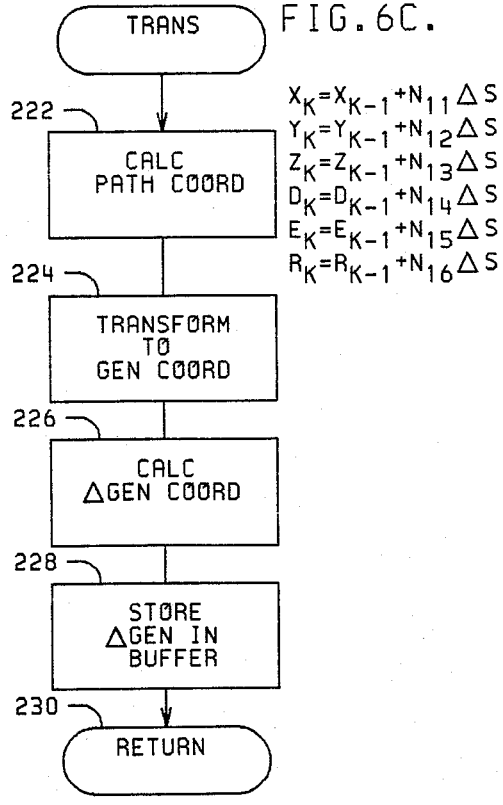
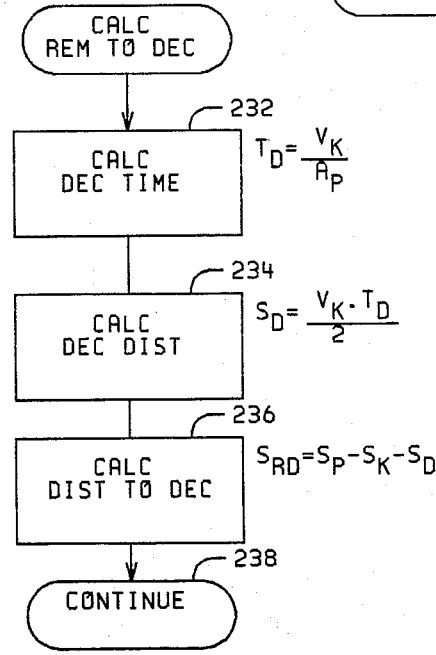

MANIPULATOR WITH CONTROLLED PATH MOTION

BACKGROUND OF THE INVENTION

This invention relates generally to program controlled manipulators and particularly to controlling the motion of a tool or other article carried by a manipulator.

It is recognized that for ease of programming, the positions and motions of a manipulator are most suitably described with reference to a rectangular coordinate system. This is particularly true where the manipulator structure includes axes of motion which do not correspond to the conventional three-dimensional coordinate system. Examples of such machines include the so-called anthropomorphic and articulated machines.

Because articulated machines would, except for coordination of machine axes motion, produce paths not intuitively expected in moving the tool from one position to another, it is also recognized that the tool motion is preferably produced by controlled interpolation of intermediate points along a path predefined in space with respect to the rectangular coordinate system. This type of control requires that the coordinates of the interpolated intermediate point be transformed to coordinates of the machine axes in order to produce coordinate motion of the machine axes to follow the predetermined path. A method and apparatus for accomplishing this type of controlled path motion is disclosed in U.S. Pat. No. 3,909,600.

The interpolation process therein described is subject to two drawbacks. First, in order to produce controlled acceleration and deceleration to accommodate the machine inertia, all variable velocity subspans are precomputed according to a selected number of predictable cases and limited to constant acceleration functions. Further, the preexecution computation requries looking ahead to subsequent position data to achieve the best velocity performance over serial spans. The entire precomputation process is cumbersome and time consuming; and because of the constant or single valued acceleration function, discontinuities occur when changing to and from the acceleration and deceleration subspans. Secondly, because the velocity characteristics of each span are precomputed, this system is not susceptible of an instantaneous velocity override as may well be appropriate in some manipulator applications.

It is therefore, an object of the present invention to provide an articulated manipulator and control for controlling motion of a function element along a predetermined path at a velocity instantaneously variable throughout the motion.

It is a further object of the present invention to provide an articulated manipulator and control for controlling motion of a function element along a predetermined path and subject to a continuously variable velocity.

It is a still further object of the present invention to provide an articulated manipulator and control for controlling motion of a function element along a predetermined path at a variable velocity subject to variable acceleration and deceleration values.

It is a still further object of the present invention to provide an articulated manipulator and control for controlling motion of a function element along a predetermined path at a continuously variable velocity subject to a continuous function of acceleration and deceleration responsive to the preprogrammed description of motion.

It is a still further object of the present invention to provide an articulated manipulator and control for controlling motion of a function element along a predetermined path at a velocity subject to variations according to a parameter independent of the preprogrammed description of motion.

Further objects and advantages of the present invention shall become apparent from the accompanying drawings and description.

SUMMARY OF THE INVENTION

In accordance with the aforesaid objects, an articulated manipulator and control are provided for controlling motion of a point associated with a function element along a predetermined path in response to a stored program of positions and path velocities therebetween. The control interpolates intermediate positions along the path by iteratively producing an incremental velocity signal representing the effective velocity for an incremental motion, calculating an incremental distance in response to the velocity signal and an increment interval signal, and calculating an accumulated displacement along the path and the coordinates with reference to the rectangular coordinate system of the end point of the accumulated displacement. Thereafter, the control effects motion of the point to the interpolated position by transforming the rectangular coordinates to coordinates measured with reference to the machine coordinate system, calculating the incremental change in machine coordinates and applying the change to the machine actuators to effect motion of the machine members. A variable acceleration function is provided to effect continuous variation of the incremental velocity signals as motion transitions to and from acceleration and deceleration phases. The control permits modification of the incremental velocity signals in accordance with a variable parameter associated with the work process being performed by the manipulator. In the preferred embodiment, the acceleration factor is computed in accordance with the cosine function ranging between zero and 2 Pi radians. The same function is used for acceleration and deceleration, the period of velocity variation depending on the magnitude of the velocity change required and the portion of the function used depending on whether acceleration or deceleration is required.

BRIEF DESCRIPTION OF THE DRAWINGS

FIGS. 5a and 5b are flow charts of the two principle control procedures effecting motion control.

FIGS. 6a through 6e are flow charts of subroutines and major sections of the flow chart of FIG. 5a.

DESCRIPTION OF THE PREFERRED EMBODIMENT

For purposes of illustrating the invention, a manipulator and control combination constituting a preferred embodiment shall be described. The manipulator and control correspond to those manufactured by Cincinnati Milacron Inc., the assignee of the present invention. It is to be understood that the particular structure of the manipulator of the preferred embodiment is not to be construed as a limitation on the present invention. Rather, any machine incorporating serially linked axes of rotary motion controlled by interpolation of intermediate points along the predetermined path defined with reference to a rectangular coordinate system or another suitable coordinate system independent of the machine coordinate system is suitable for application of applicant's invention. Further, while the preferred embodiment interpolates linear paths, other paths, circular or parabolic for example, could as well be interpolated.

Figure 1:
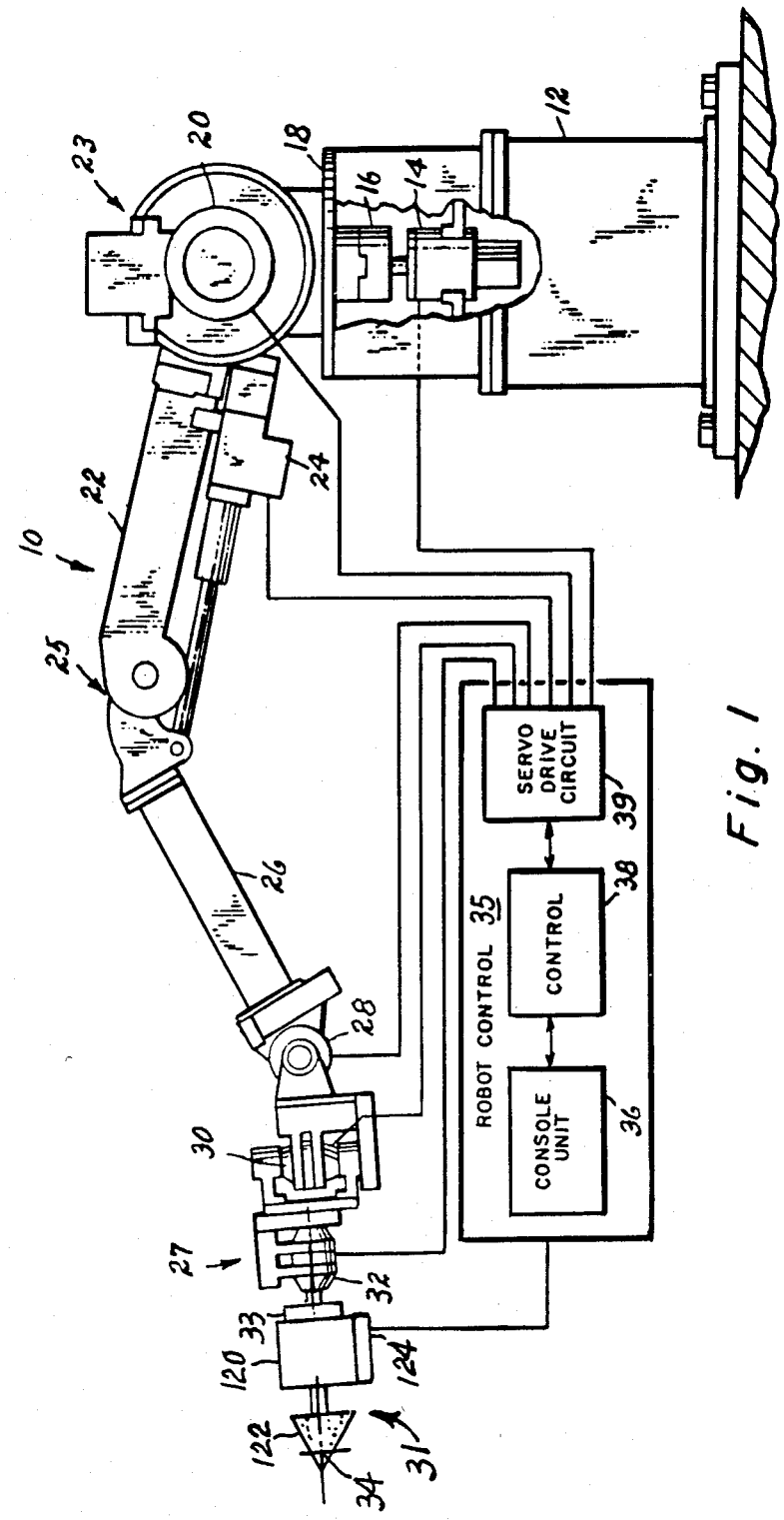
FIG. 1 shows the articulated manipulator and the schematic connection thereof the control.

Referring to FIG. 1, the articulated manipulator 10 is shown connected to control 35 and carrying grinding tool 122 and tool motor 120. The manipulator 10 includes base 12 upon which is rotatably mounted the shoulder plate 18 and within which are the shoulder rotation actuator 14 and the intermedite coupling 16. Actuator 14, coupling 16 and mounting plate 18 cooperate to effect rotation of the manipulator structure about a vertical axis passing through the center of plate 18. Upper arm 22 is rotatably supported upon plate 18 at the shoulder joint 23 and rotated about a horizontal axis intersecting the vertical axis through the center of the shoulder joint 23. Rotation of the upper arm 22 about this axis is effected by actuator 20. A forearm 26 is connected to upper arm 22 at an elbow joint 25 and is rotated thereabout by means of actuator 24 which may be a lineal actuator such as a piston and cylinder or screw and nut. The actuators 14, 20, and 24 are sufficient to effect motion of the forearm 26 to place the end thereof in any position within the volume described by the mechanical limitations of the structure.

To maximize the flexibility of motion achieved by control of the manipulator, three additional axes of motion follow forearm 26. These three additional axes are intended to effect control over the orientation of the tool carried by the manipulator with respect to a relocatable point of reference. The first of these orientation axes corresponds to a rotation about a horizontal axis at the end of the forearm 26 driven by actuator 28 to effect changes in pitch of a tool carried by the manipulator. The second orientation axis is vertical and perpendicular to the first and effects changes of yaw of the tool carried by the manipulator and is driven by actuator 30. The third orientation axis for controlling roll is perpendicular to the second axis and is driven by actuator 32. These three orientation axes constitute the wrist 27 of manipulator 10.

At the end of wrist 27, is the face plate 33 to which is mounted the tool motor 120 carrying the grinding tool 122. Attached to tool motor 120 is a transducer 124 for feeding back a measured parameter of the work process. The motor 120 and tool 122 constitute a function element 31 carried by manipulator 10. Other tools may be readily substituted including workpiece grasping devices to effect motion of workpieces relative to fixed tools. The stored program for controlling the motion of function element 31 specifies positions of a tool centerpoint 34 and orientations of the function element 31 with respect to the relocatable tool centerpoint 34.

Control 35 includes a console unit 36 to permit communication between an operator and the manipulator 10, a control 38 for processing a stored program directing the movements of manipulator 10, and a servodrive circuit 39 responsive to control 38 for controlling the machine actuators 14, 20, 24, 28, 30 and 32. Since the particular type of actuators and drive circuits do not form a part of the present invention, further details of these devices shall not be provided.

Figure 2:
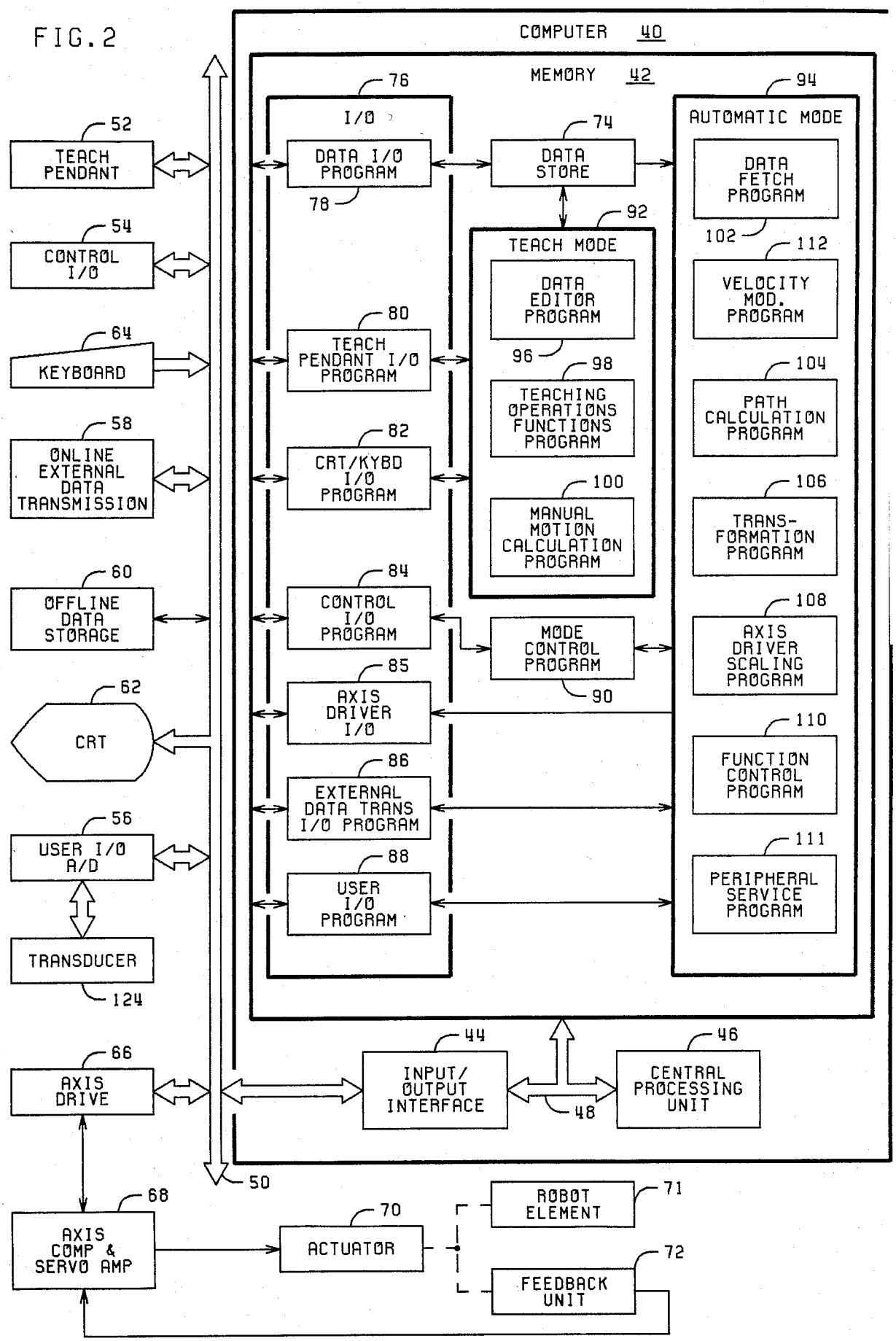
FIG. 2 is a block diagram of the control with its associated input and output interface modules.

Referring to FIG. 2, a detailed block diagram of the control shall be described. The control 35 includes a programmable general purpose digital computer 40 comprised of a memory 42, a central processing unit 46 and an input/output interface 44. These three elements are interconnected by bus 48. Interaction between computer 40 and the manipulator 10 and an operator are carried out by signals passed over the external bus 50 connected to a number of peripheral devices. The peripheral devices most suitable for use by an operator include the teach pendant 52 for manually producing motion commands to generate a stored program, keyboard 64 for entering information to computer memory 42 and CRT 62 for displaying data relating to the current activity of the manipulator and its stored program.

The peripheral devices used to interface the manipulator 10 to control 35 include: the control input/output interface 54, which exchanges a number of discreet device signals between the manipulator and control necessary for the operation of manipulator 10; the user input/output interface 56 which exchanges signals to and from application dedicated devices associated with manipulator 10, and shown in this case incorporating an analogue-to-digital converter being connected to the transducer 124; and the axis drive interface 56 which directly controls the motion of the actuators. The axis drive 66 accepts data in digital form and executes a digital-to-analogue conversion thereby providing an analogue signal to the axis compensation and servoamplifier 68. The compensated analogue signals are then used as an input to an actuator 70 which drives the robot element 71 mechanically attached thereto. A feedback device 72, mechanically connected to actuator 70 or robot element 71, provides a feedback signal representing the actual motion of the driven element of the robot arm. Although there are several configurations for control of the servomechanism loop for each element of the robot arm, in the preferred embodiment, the axis drive 66, servoamp 68, actuator 70 and feedback element 72 are utilized in numbers equal to the number of controlled axes on the manipulator.

Two further peripheral devices permit the exchange of program data. First, the on-line external data transmission interface 58 represents a device which allows data to be entered into the computer 40 from an external data store while the manipulator is executing a cycle of operation. Second, an off-line data storage interface 60 is provided for allowing program data to be input to the computer by means of such devices as a punched tape reader, a cassette reader, etc.

The memory 42 within computer 40 is comprised of two primary components. The first is the data store 74 which stores all numerical data information, and the second component defines the operating system of the manipulator. The operating system is a set of control programs directing the operation of computer 40 to effect the generation of the users program and the execution of the stored user program. For purposes of illustration, the operating system programs are shown in functionally related sets including the input/output set 76, the teach mode set 92, and the automatic mode set 94.

Included in the input/output set 76, are the data I/O program 78, teach pendant I/O program 80, a CRT and keyboard I/O program 82, a control I/O program 84, an axis driver I/O program 85, an external data transmission program 86 and the user I/O program 88. Each of these input/output programs correspond to a different type of peripheral being interfaced to the control and is effective to control the signal exchange between the particular peripheral device and the computer 40.

The operating system also contains a mode control program 90 for switching control of the computer between the various operating modes, for example, manual, teach, automatic, etc. Since only the automatic mode is required for the disclosed invention, only this mode will be described in detail. Within the teach mode system 92 are the data editor program 96 and a teaching operation function program 98. These two programs control the operation of the manipulator during the teach mode, and the specifics of these programs are either described in U.S. Pat. No. 3,920,972 or are avaiable from Cincinnati Milacron Inc. The automatic mode set 94 includes a data fetch program 102, a path calculation program 104, a transformation program 106, an axis driver program 108, a function control program 110, a peripheral service program 111, and a velocity modification program 112. Details of the path calculation program shall be provided herein and details of the other programs are either specifically described in U.S. Pat. No. 3,909,600 or are available from Cincinnati Milacron Inc.

Figure 3:
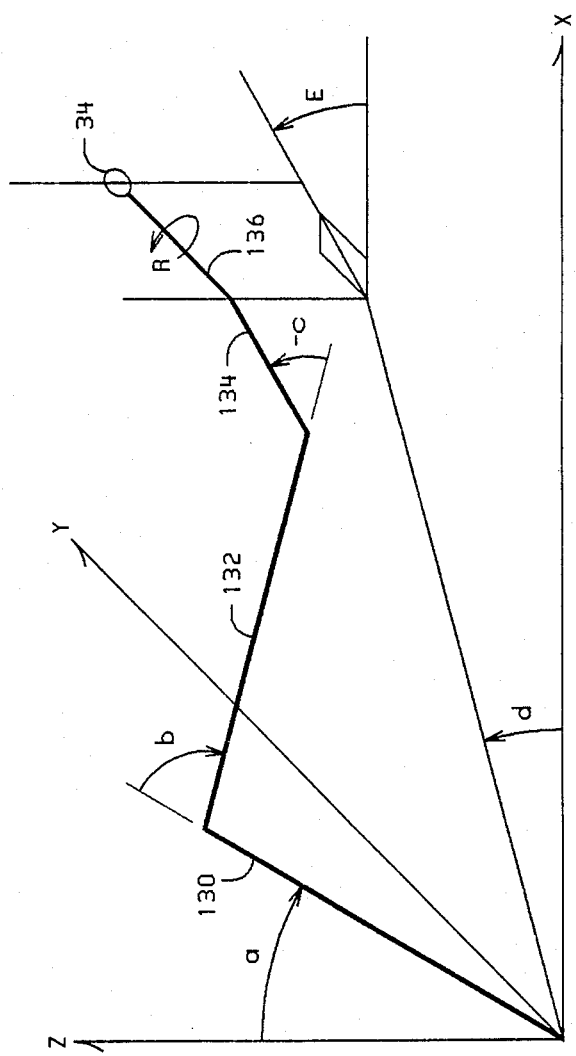
FIG. 3 is a geometric representation of the machine defined generalized coordinate systems.

The machine coordinate system of manipulator 10 shall be described with reference to the schematic representation of FIG. 3. As has heretofore been described, each axis of motion of manipulator 10 is an axis of rotary motion. Assume that the rectangular coordinate system of FIG. 3 has its origin located at a point slightly above mounting plate 18 and coinciding with the axis of rotation of actuator 20. The Z axis coordinate coincides with the center of rotation of mounting plate 18. Thus, rotations of mounting plate 18 correponds to motion through the angle "d". Line segment 130 corresponds to upper arm 22, and rotation about the center of actuator 20 corresponds to a rotation of line segment 130 through the angle "a" measured positively with respect to the Z axis in the direction indicated by the arrow. The line segment 132 corresponds to the forearm 26 and rotations of forearm 26 about the elbow joint 25 correspond to rotations of line segment 132 through the angle "b" measured positively in the direction indicated by the arrow in FIG. 3. The first bend axis of the wrist 27 at actuator 28 corresponds to a rotation of line segment 134 through the axis "c" and measured negatively in the direction from the extension of line segment 132 as indicated by the arrow. The second bend axis of wrist 27 corresponding to the rotation of the actuator 30 is illustrated by the rotation of line segment 136 through the angle E measured with reference to the X axis and shown by projection in the X—Y plane. The roll of wrist 27 corresponds to the rotation of line segment 136 indicated by the angle R. The tool centerpoint 34 is defined as a point at the end of the line segment 136. The length of segment 136 includes a user specified tool length and the section of wrist 37 beyond yaw axis 30.

The stored program includes the X, Y and Z axis coordinates of tool centerpoint 34 together with the angles of orientation D, E, and R. The orientation angle D is equal to the sum of angles "a" "b", and "c". As shown in FIG. 3, tool centerpoint 34 is located upon the axis of the line segment 136; however, an offset tool centerpoint may also be accommodated. It should now be apparent that provided the lengths of segments 130 through 136 are known and provided the program specifies the orientation angles for pitch, yaw, and roll, D, E, and R, respectively, and provided the X, Y and Z coordinates of tool centerpoint 34 are specified, then the unique combination of actuator angles "a", "b", "c", and "d" can be determined. These actuator angles together with the actuator angles of the orientation axes comprise the machine coordinate system. The details of a transformation from program coordinates to a machine coordinate system neglecting the roll axis R is described in U.S. Pat. No. 3,909,600 wherein the term generalized coordinate system corresponds to the machine coordinate system hereinabove described. The present invention uses the same transformation technique.

Figure 4A:
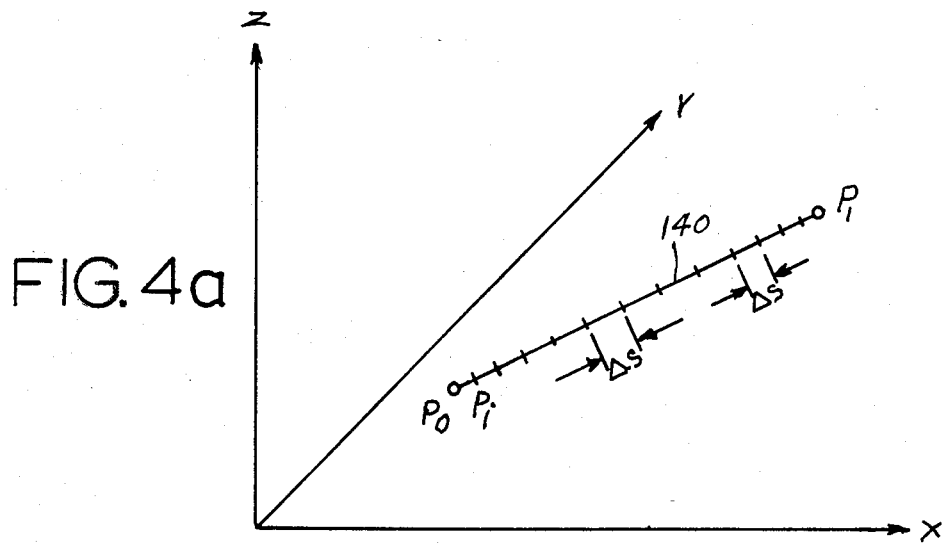
FIGS. 4a through 4c are geometric representations of the motion control effected over the tool carried by the manipulator.
Figure 4B:
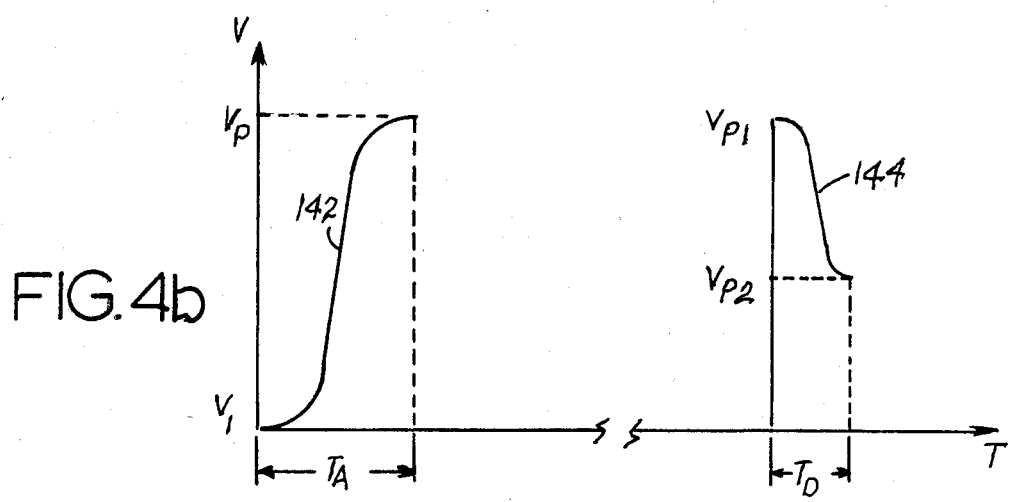
Figure 4C:
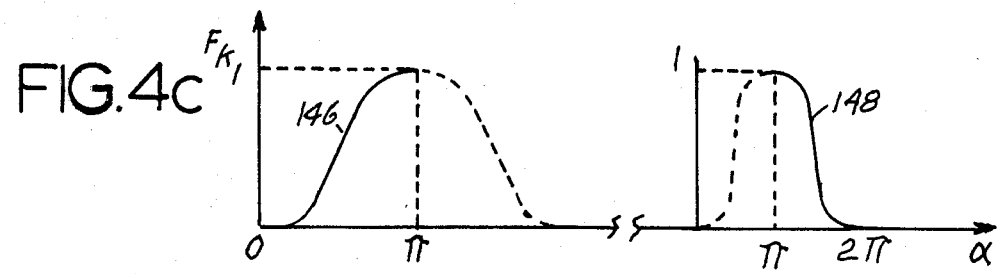

Referring to the geometric schematic representation of FIGS. 4a through 4c the path control scheme of the present invention shall be described. In FIG. 4a, the straight line segment 140 represents the path of motion along which the tool centerpoint is to proceed in travelling from point P0 to point P1 defined by stored input signals. The control interpolates intermediate points $P_i$ along this straight line path. The coordinates of points P0, P1 and the intermediate points $P_i$ are all defined with respect to the X, Y, Z coordinate system. Assuming that the tool centerpoint is to start from rest at point P0, and come to rest again at point P1, then the path control scheme provides automatic acceleration and deceleration to and from a programmed velocity. While the intermediaate points $P_i$ are produced in accordance with a fixed increment interval period, the actual incremental distance between points $P_i$ varies as the velocity of the tool centerpoint varies. Thus, the incremental distance $\Delta S$ which corresponds to the distance traversed during a constant incremental interval $\Delta T$ is seen to vary between the constant velocity portion of the motion and the acceleration and deceleration phases of the prescribed motion. As has been previously stated, the path control scheme above described in similar to that described in U.S. Pat. No. 3,909,600 with the significant exception that in applicant's path control scheme velocity variations between points P0 and P1 are accomplished in accordance with procedures executed as part of the interpolation process so as to eliminate the discontinuities between the acceleration and deceleration phases.

Referring now to FIGS. 4b and 4c, we see the velocity and acceleration characteristic curves employed by applicant. Curve 142 of FIG. 4b shows an increase in velocity from an initial velocity $V_i$ to a programmed velocity $V_p$. This velocity characteristic results from applying an acceleration function corresponding to the solid portion of the inverted cosine curve 146 to FIG. 4c, that is, the portion of the curve ranging from O to Pi radians. Referring now to FIG. 4b, the velocity characteristic curve 144 shows a deceleration from an initial program velocity $V_{p1}$ to a second programmed velocity $V_{p2}$ as may be encountered when the manipulator is commanded to continue motion through a programmed position. For purposes of comparision, the differential between program velocities $V_{p1}$ and $V_{p2}$ is made less than the differential between the program velocity $V_p$ and the initial velocity $V_i$ of curve 142. It is seen by comparing the two curves, 142 and 144, that the change in velocity from $V_{p1}$ to $V_{p2}$ is accomplished in less time than is the change in velocity from $V_1$ to $V_p$. Nevertheless, the change in velocity from $V_{p1}$ to $V_{p2}$, that is, the deceleration, is accomplished in accordance with the solid portion of the cosine function illustrated in FIG. 4c as curve 148. The cosine function 148 is completed in a shorter period of time then was the cosine function 146. For deceleration, the cosine function variable, alpha, is given values between Pi ($\pi$) and two Pi ($2\pi$) radians. It will now be appreciated that by use of the cosine function acceleration factor, the incremental velocities are made continuous as the velocities are varied during motion between the programmed positions.

The overall cycle of operation of manipulator 10 in the automatic mode is illustrated by the flow chart of FIG. 5a. At process step 150 the control initializes the span data required to interpolate the motions between the programmed points P0 and P1 at the programmed velocity $V_p$. Values for the programmed span length Sp, the coordinate component ratios $N_{cc}$ and a nominal acceleration are produced by the procedure associated with step 150. At process step 152 an increment along the path is interpolated to produce the incremental distance $\Delta S$ and the accumulated incremental distance $S_K$. Process step 156 calls the subroutine to effect a transformation of the interpolated intermediate point to the generalized coordinates. At decision step 154 the flag indicating no deceleration is to take place is tested. When the motion of tool centerpoint 34 is to be continuous through a programmed position, a function attribute so indicating is programmed. It may then occur that no deceleration would be required in the present span and the no deceleration flag would be set as described subsequently. In that case, the process would continue following the yes side of decision step 154 to decision step 155 where it is determined whether the current increment is the last increment of the current span. If not another increment is interpolated through the connector L-2. Eventually, the final increment of the current span would be interpolated and the overall cycle of operation would continue from decision step 155 to process step 168 through connector L3. Process step 168 causes the function programmed with position P1 to be executed when the machine axes have reached the end of span. Thereafter, decision step 170 determines whether the programmed position P1 corresponds to the end of the program. If not, the cycle is repeated by accessing the next programmed data at process step 150 by the connector L-1. If the position is the last position of the program then the entire program is recycled beginning at a preselected programmed position as indicated by terminal 172.

Assuming that the no deceleration flag had not been set, then the overall cycle of operation from decision step 154 continues at process step 158. Process step 158 calculates the distance remaining in the current span prior to the point at which a deceleration to stop must begin. When the remaining distance to the beginning of the deceleration phase $S_{RD}$ is greater than the current incremental distance $\Delta S$, as determined by decision step 160, then the cycle continues through process step 162 which calls the velocity variation subroutine for instantaneously changing or adjusting the incremental velocity value in accordance with nonprogrammed variations of a work process or adaptive parameter or other suitable control parameter. Upon completion of this subroutine the procedure continues through the loop at process step 152 where the span increment is interpolated using the most recently created value of incremental velocity. Once the distance remaining in the span prior to the starting point for deceleration is less than the current incremental distance, then the YES side of decision step 160 leads to decision step 164 which tests for the indication in the stored program that the next point $P_1$ is a continue point. As each point programmed may have associated with it a function signal designating a particular function associated with the work process to be performed at that point, continue points are marked by the presence of a function attribute indicating that the function is to be executed while motion continues. Assuming that the continue code was not detected by decision step 164 then the deceleration procedure is called by process step 166. The deceleration procedure effects the interpolated deceleration to the stopping point P1. Thereafter, process step 168 causes the execution of a function programmed in association with the point P1. Decision step 170 then determines whether or not the current point represents the end of the robot program and if not the procedure continues through the connector L1 to process step 150 to process data for the next programmed position. If the current position is the end of the stored program, then the program is repeated by selecting a program entry designated as a recycle position as indicated by the terminal 172.

If at decision step 164, it had been determined that the next position was a continue point, then the process continues at process step 180 where a new end position for the current span is computed. Because the interpolated intermediate positions are spaced apart by an incremental distance defined by the incremental interval period and the effective increment velocity, it is anticipated that when motion is to continue through a programmed position the distance remaining in the span from the deceleration decision position to the programmed end position will not always equal an integral multiple of the current incremental distance. To account for this discrepancy the current span is effectively terminated at the integral multiple of the current incremental distance nearest the programmed end position. To accomplish this, the distance remaining $(S_p - S_k)$ is divided by the incremental distance $\Delta S$ to produce the integer multiple and remainder. The current span length is then reduced by the remainder to produce the continue span length $S_{CP}$. This distance then redefines the end positions of the current span and the start position of the next span.

At decision step 174 a determination is made whether the included angle between the current span and the next span is less than 120 degrees. This determination is made by producing two values $S_T^2$ and $S_{T(120)}^2$ for the square of the total distance between the start position P0 of the current span and the end position P2 of the next span. The first value $S_T^2$ is computed as the sum of the squares of the coordinate component differences between the two positions. The second value $S_{T(120)}^2$ is computed in accordance with the equation for the length of the third side of a triangle given the length of the other two sides and the angle between them:

$$W\alpha = A + B = 2AB \cos \alpha$$

which reduces to:

$$W = A^2 + B^2 + AB \text{ when } \alpha = 120 \text{ degrees}$$

Since the result of process step 180 was to produce a new end position for the current span the length of the spans have been altered from the programmed lengths. The length of the current span is $S_{CP}$ and the length of the next span $S_N$ is defined by the new start position of step 180 and the programmed end position P2 of that span. If the included angle is less than 120 degrees, then it is necessary to bring the motion to a halt before proceeding and the process would again continue through the call to the deceleration procedure at process step 166. If the included angle is 120 degrees or greater, then the process continues at decision step 176 to determine whether or not the programmed velocity of the next span is greater than or equal to the current programmed velocity. If the programmed velocity of the next span is less than the programmed velocity of the current span, then it is necessary to effect a deceleration in the current span so that the motion in the next span will be started at the velocity programmed for that span. Following the deceleration procedure called by the process step 178, the overall cycle is continued at the process step 168 through connector L-3. If the programmed velocity for the next span is in fact greater than or equal to the programmed velocity of the current span, then the process from decision step 176 continues at the process step 177 which sets the no deceleration flag. Thereafter, the overall cycle of operation previously described is resumed through the connector L-2. It should now be apparent from the foregoing description that the overall cycle of operation consists of the repeated interpolation of intermediate positions between the programmed positions by iteratively repeating control processing procedures and the execution of the functions associated with the programmed positions.

Referring now to FIG. 5b, the routine for servicing the actuator servomechanisms is shown. While the overall cycle of operation is being executed, an independent servointerrupt service routine is processed. A servo system clock generated by central processing unit 46 periodically interrupts the overall system processing to apply the freshly created actuator coordinate data to the actuator servomechanisms. Decision step 192 determines whether or not the buffer storage area for the actuator command data is currently empty. If the buffer is empty, it indicates that the current spa has been completed, and the end of span flag is set by process step 194. However, if there is data in the buffer, then process step 196 transfers the data from the buffer to the servo. In either event, the servicing of the servointerrupt is complete and the overall system processing under control of the flow chart of FIG. 5a is continued by the return through terminal 198.

The flow charts of FIGS. 6a through 6e correspond to major segments or subroutines of the flow chart of FIG. 5a. Particularly, the flow chart of FIG. 6a corresponds to the process step 150 of FIG. 5a. At process step 200 programmed span data corresponding to preprogrammed input signals is recalled from data store 74 of memory 42. The start point P0, end point P1 and program velocity $V_p$ define the motion to be next executed by tool centerpoint 34. The programmed coordinate data recalled from memory are shown subscripted in correspondence with the program point designation. At process step 202 the total span length is computed using the rectangular coordinates of the two programmed points and extracting the square root of the sum of the squares of the coordinate components. At process step 204, the in-axis component ratios of the programmed coordinate system are computed by dividing the coordinate components by the span length. These ratios are designated $N_{11}$ through $N_{16}$. Axis component ratios for the orientation angles are computed in the same way as the component ratios for the rectangular coordinate axes. At process step 206, a nominal span acceleration rate is calculated by dividing the programmed velocity $V_p$ by an arbitrarily chosen interval of one quarter second. Once this preliminary computation of span variables is completed, the overall cycle of operation continues through the terminal 208 to the process block 152 of FIG. 5a.

Referring now to FIG. 6b, the process step of interpolation of a span increment corresponding to block 152 of FIG. 5a is expanded into a more detailed flow chart. Beginning at decision step 210, the determination is made whether or not an adaptive or nonprogrammed velocity flag has been set by the subroutine called by process step 162 of FIG. 5a. If there is no adaptive velocity function programmed for the current span, or if the adaptive velocity function has not resulted in a change to the incremental velocity value, then the adaptive velocity flag will not be set and the process will continue at decision step 212. Decision step 212 tests the value of the current incremental velocity signal $V_K$, that is, the incremental velocity for the current iteration K, against the value of the programmed velocity signal $V_p$ to determine whether or not the current incremental velocity is less than the programmed velocity. If so, the process continues at the process step 216 which calls the acceleration subroutine.

The effect of the acceleration subroutine is to produce a new value for the incremental velocity in accordance with the cosine function acceleration factor shown and described with reference to FIGS. 4b and 4c. Thus, at the beginning of a move where the tool centerpoint starts from rest, the initial value of the incremental velocity shall be zero, the programmed velocity will, of course, be a nonzero value and the call to the acceleration subroutine at process step 216 begins the change of the incremental velocity values $V_K$ in accordance with the cosine function acceleration factor F. Upon completion of the acceleration subroutine, the process will continue at process step 218 where a value for an incremental distance signal $\Delta S$ is calculated in accordance with the formula set to the right of the process step of FIG. 6b. This formula produces a distance value by averaging the new incremental velocity value $V_K$ with the previous incremental velocity value $V_{K-1}$ and assuming the average is effective during the period represented by incremental interval signal $\Delta t$. When the incremental velocity $V_K$ is not less than the programmed velocity $V_p$, it is not necessary to calculate a new value for the incremental distance signal and it is only necessary to increment the iteration counter as indicated by process step 214. In either event, the process ultimately resumes at process step 220 where the value of the accumulated increment signal $S_K$ is calculated in accordance with the equation set forth to the right of process step 220. The overall cycle of operation is then continued by the continue of flow chart terminal 221. At this point, the overall cycle of operation continues by the call of process step 156 of FIG. 5a calling the transform subroutine illustrated in the flow chart of FIG. 6c.

Referring to FIG. 6c, at process step 222 the values of the end point coordinate signals representing coordinates with respect to the rectangular or first coordinate system of the accumulated interpolated distance are calculated. This is accomplished by summing the in-axis components of the interpolated incremental distance represented by the increment distance signal ΔS with the previous values of the end point coordinate signals subscripted K−1. Thereafter, the coordinates with reference to the programmed coordinate system of the interpolated point are transformed to coordinates of the generalized or machine coordinate system to produce a set of machine coordinate signals representing coordinate values relative to the machine coordinate system by process step 224. To avoid inverse trigonometric functions, an iterative approximation algorithm is used that produces an error function based on the current machine coordinate values. Details of this approach are shown in U.S. Pat. No. 3,909,600, which, to the extent necessary for describing this transformation algorithm, is hereby incorporated herein by reference. At process step 226, the change in the generalized coordinates is calculated and at process step 228 the incremental difference of the generalized coordinates are stored in the buffer for access by the servointerrupt service routine. When the transformation subroutine is completed, the processing of the overall cycle of operation is resumed by the return through terminal 230. This, then, brings the process to decision step 154 of FIG. 5a. Following step 154 the overall cycle continues at process step 158 where the remaining distance to the beginning of the deceleration span is calculated and the detailed flow chart of this process step is shown in FIG. 6d.

Figure 6E:
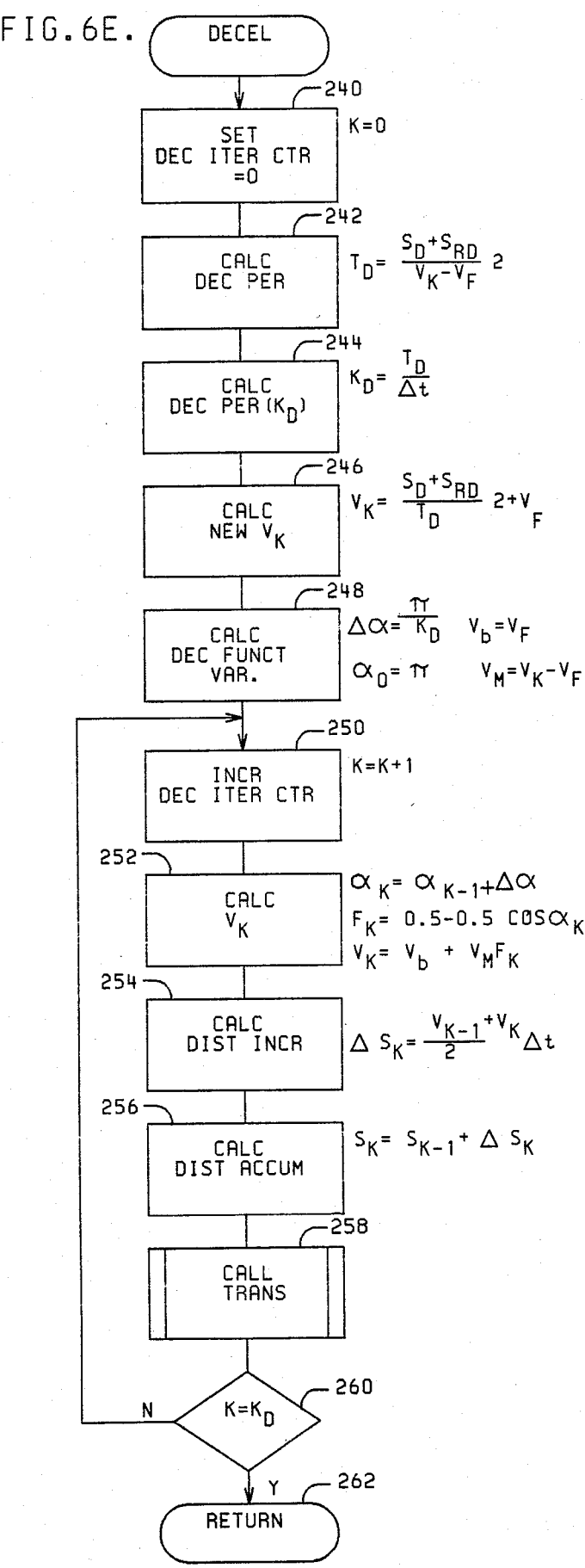

Referring now to FIG. 6d, process step 232 calculates the period required to decelerate using the nominal value of acceleration calculated during the preparation of the span variables. Thus, the approximate time required to decelerate to stop is equal to the quotient of the current incremental velocity $V_K$ and this nominal constant of acceleration. At process step 234, a value of a deceleration distance signal representing the distance required to decelerate is calculated assuming that an average velocity equal to half the current incremental velocity would be in effect during the internal calculated in process step 232. And finally, at process step 236, a value of a span remainder signal $S_{RD}$ is calculated representing the remaining distance within the programmed span length from the current interpolated position to the point at which the just calculated deceleration distance must begin. Thus, the distance remaining $S_{RD}$ is equal to the programmed span length $S_p$ less the portion of the span represented by the accumulated interpolated distance $S_K$ and the portion of the span necessary to decelerate $S_D$. Following this calculation, the overall cycle of operation continues at decision step 160 of FIG. 5a wherein it is determined whether or not this remaining distance $S_{RD}$ is less than the current effective incremental distance ΔS. If the remaining distance $S_{RD}$ is not less than the current effective incremental distance ΔS then another increment of that distance can be interpolated. If, however, the current effective incremental distance ΔS is greater than the calculated remaining distance $S_{RD}$, it is necessary to immediately begin deceleration. The deceleration subroutine is illustrated in the flow chart of FIG. 6e.

The deceleration subroutine iteratively produces decreasing values of the incremental velocity variable $V_K$ in accordance with the cosine function acceleration factor F. At the start of the deceleration subroutine, the incremental velocity is recomputed to adjust for the round-off errors of the integer arithmetic executed by the computer used by applicant. Referring now to FIG. 6e, process step 240 sets the deceleration iteration counter equal to zero. At process step 242, the period of deceleration $T_D$ is calculated as two times the quotient of the as yet unexecuted span length and the change in velocity between the current incremental velocity $V_K$ value and the final velocity $V_F$ at which the current span is to finish. The final velocity $V_F$ is zero in all cases except when the next programmed position is a continue point and the included angle between the current span and the next span is equal to or greater than 120 degrees. At process step 244, the number of iterations $K_D$ required to effect the deceleration is computed as the quotient of the calculated period of deceleration $T_D$ and the predefined increment interval period Δt. At process step 246, a new value for the incremental velocity $V_K$ is calculated as the sum of the final velocity $V_F$ and two times the quotient of the remaining distance of the current span and the calculated period for deceleration $T_D$. As was previously stated, this recalculation of the incremental velocity $V_K$ is necessitated by the use of integer arithmetic in applicant's digital computer. At process step 248, a value of an increment variable change signal representing the incremental change of angle for the cosine function variable is computed as the quotient of Pi ($\pi$) radians and the number of iterations required for deceleration $K_D$. In addition, the deceleration function variable signal (alpha) is initialized to be equal to Pi ($\pi$) radians, the velocity base signal $V_b$ is set equal to the value of the final velocity $V_F$, and the velocity error signal $V_M$ is set equal to the difference between the current velocity $V_K$ and the final velocity $V_F$. At process step 250, the deceleration iteration counter is incremented. Thereafter, at process step 252, the new value for the incremental velocity signal $V_K$ is calculated. This calculation involves three primary subcalculations. First, a value of an increment variable signal $\alpha_K$ representing the iterative value of the cosine function variable is calculated as the sum of the previous variable value plus the increment variable change value. Second, the acceleration factor is calculated as the difference between the integer one-half and one-half the cosine of the current iterative value of the cosine function variable. Finally, a value of the increment velocity signal $V_K$ is calculated by summing the base velocity $V_b$ and the product of the velocity error $V_M$ and the acceleration factor F, the product constituting the value of an increment velocity change signal. The base velocity signal was set equal to the final velocity of the current span, and, with the exception of the continue points, would be equal to zero. Since the cosine function variable is initialized to the value of Pi radians the acceleration factor will have its maximum value on the first iteration and thereafter will have decreasing values in accordance with the cosine function as the cosine function variable is iteratively increased from Pi radians to 2 Pi radians. At process step 254, the incremental distance ΔS is calculated as the product of the average incremental velocities of the current and previous increments and the incremental interval point Δt. At process step 256, the accumulated interpolated distance $S_K$ is calculated as the sum of the previous interpolated distance and the incremental distance ΔS. At process step 258, the transformation subroutine is called and at decision step 260 the iteration counter is tested for equality with the previously calculated deceleration iteration value. If they are equal, the deceleration subroutine is complete and the overall cycle of operation is resumed by the return of the terminal 262. However, if the iteration counter is not equal to the deceleration iteration value, then the deceleration iterative loop is repeated by the return line bringing processing back to process step 250.

It will now be appreciated by those skilled in the art that the iterative procedure for recalculating the incremental velocity value produces the change in velocity of curve 144 of FIG. 4b in accordance with the acceleration factor curve 148 of FIG. 4c. By contrast to the deceleration subroutine, applicant has chosen to incorporate the acceleration subroutine into the overall incremental span interpolation process.

Figure 7:
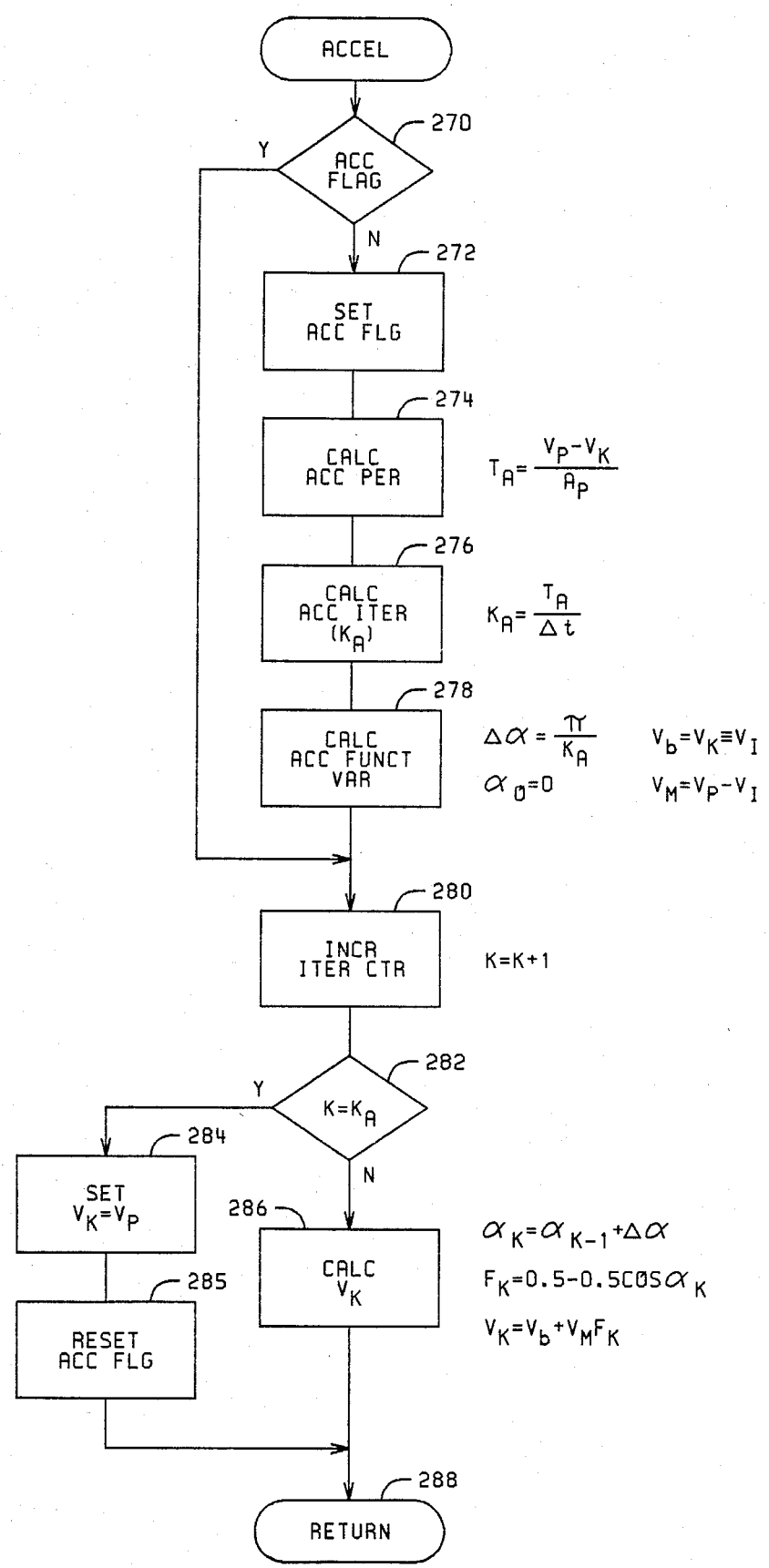
FIG. 7 is a flow chart of the acceleration procedure used by the interpolation procedure of FIG. 6d.

Referring now to FIG. 7, the flow chart for the acceleration subroutine is shown. In the event decision step 212 of FIG. 6b determines that the value of the current incremental velocity $V_K$ is less than the programmed velocity, the acceleration subroutine is called by process step 216 and begins at decision step 270 of FIG. 7 to determine whether or not the current iteration through this procedure is the first iteration. This is determined by looking for the condition of the acceleration flag. If the acceleration flag has not been set then the process continues at process step 272 which sets the acceleration flag. At process step 274, the acceleration period $T_A$ is calculated by dividing the velocity difference between the current incremental velocity and the programmed or desired velocity, by the nominal acceleration rate. Next, at process step 276 the number of iterations $K_A$ necessary to accomplish the required acceleration is computed as the quotient of the calculated period of acceleration $T_A$ and the incremental interval period $\Delta t$. At process step 278, the acceleration function variables are computed including the angular increment. The angular increment or value of the increment variable change signal is equal to the quotient of Pi radians and the number of iterations required to complete the acceleration. The cosine function variable signal (alpha) is initialized to zero, the base velocity signal value is set equal to the value of the current incremental velocity signal $V_K$ representing an initial velocity value $V_I$ at which the acceleration was entered, and the velocity error signal is set equal to the difference between the desired or programmed velocity $V_p$ and the initial velocity value. Had the acceleration flag been set, then steps 272 through 278 would have been skipped by the bypass line on the YES side of the decision step 270. In either event the acceleration procedure continues at process step 280 where the iteration counter is incremented. The iteration counter is then tested for equality with the acceleration iteration value at decision step 282 and assuming the current value of the iteration counter is less than the acceleration iteration value, then a new incremental velocity value is computed at process step 286. This calculation involves three primary steps. First the value of the increment variable signal is calculated representing the current iteration value of the velocity function angle variable and is equal to the sum of the previous angle variable value and the increment variable change signal value. Second, the acceleration factor is computed as the difference between the integer one-half and one-half the value of the cosine of the increment variable signal $\alpha_K$. Third, the increment velocity signal value is computed as the sum of the base velocity and the product of the previously computed velocity error value and the acceleration factor. The product is the value of an increment velocity change signal. Once the new increment velocity signal value has been computed, the process continues in the incremental span interpolation procedure at process step 218 of FIG. 6b by means of the return of terminal 288. If decision step 282 of FIG. 7 had determined that the iteration counter was equal to the acceleration iteration value, then the incremental velocity is set equal to the programmed velocity by process step 284; and thereafter, the acceleration flag is reset by process step 285. Once again, the processing would continue by return through terminal 288. It will now be appreciated that the iterative processing of the acceleration factor produces the changing velocity function in accordance with the curve 142 of FIG. 4b following the cosine function curve 146 of FIG. 4c.

It should be noted that while most programmed spans will include acceleration, constant velocity, and deceleration subspans or phases, the execution of the deceleration subroutine could be initiated before the tool centerpoint velocity reaches the programmed velocity. This would occur if the programmed span length were insufficient to permit acceleration to the programmed velocity before decision step 160 of FIG. 5a determines the need to begin deceleration. While there would then occur a discontinuity in velocity, the cosine function deceleration would minimize the effects of that discontinuity by virtue of the limited velocity changes occurring immediately after the onset of deceleration.

While the basic path control algorithm provides for continuous velocity variations during the acceleration and deceleration phases of motion, an additional velocity variation is readily accommodated as previously indicated with reference to process step 162 of FIG. 5a. By means of transducer 124, a work process parameter such as the torque of tool drive motor 120 may be continuously monitored. This torque value may then be converted to a digital value at the user I/O analogue to digital converter; 56 and, provided a suitable error function is devised, velocity variations may be produced in response to the measured torque. These velocity variations are then implemented in the overall cycle of operation by the subroutine called by process step 162 of FIG. 5a. The details of this unprogrammed velocity variation do not comprise a part of the present invention.

While the invention has been illustrated in some detail according to the preferred embodiment shown in the accompanying drawings; and while the preferred embodiment has been described in some detail, there is no intention to thus limit the invention to such detail. On the contrary, it is intended to cover all modifications, alternations and equivalents falling within the spirit and scope of the appended claims.

What is claimed is:

1. An apparatus for moving a function element in response to input signals defining, with respect to a first coordinate system, a sequence of positions of a tool centerpoint associated with the function element and path velocities therebetween, the tool centerpoint following a predetermined path between any two successive positions, the tool centerpoint velocity along the predetermined path subject selectively to variation in accordance with a predetermined acceleration function and unprogrammed variations of a control parameter, the apparatus comprising:
(a) a manipulator upon which the function element is mounted, the manipulator having;
  (1) a plurality of members describing a plurality of axes of motion, at least two of the members being linked by the axes of rotation, the members and axes of motion defining a generalized coordinate system, and
  (2) a plurality of actuators, each member having associated therewith at least one actuator for effecting motion of the member,
(b) a manipulator control including a servomechanism circuit connected to the actuators to control motion of the members, the control executing the steps of;
  (1) producing an increment interval signal representing a period for completion of an increment of motion of the tool centerpoint along a predetermined path,
  (2) producing an increment velocity signal representing the path velocity of the tool centerpoint during the increment period,
  (3) producing end point coordinate signals in response to the increment interval signal and the increment velocity signal, the end point coordinate signals representing coordinates with respect to the first coordinate system of an intermediate point along the predetermined path,
  (4) producing a set of machine coordinate signals in response to the end point coordinate signals, the machine coordinate signals representing coordinate values of the intermediate point relative to the generalized coordinate system,
  (5) applying the set of machine coordinate signals to the servo mechanism circuit to effect coordinated motion of the members to move the tool centerpoint to the intermediate point,
  (6) Iterating steps 1 through 6 to cause the tool centerpoint to move through a series of increments along the path, and
  (7) selectively accelerating and decelerating the tool centerpoint by modifying the increment velocity signal during the iteration of steps 1 through 6, the modifications being effected in response to, selectively, the predetermined function of acceleration and the unprogrammed variations of the control parameter.

2. The apparatus of claim 1 wherein the input signal define motion of the tool centerpoint requiring at least one acceleration thereof from an initial velocity to a desired velocity specified by input signals and the step of modifying the increment velocity signal further comprises the steps of:
(a) producing a velocity error signal representing the difference between an initial velocity and a desired velocity;
(b) producing a base velocity signal representing a velocity value from which incremental velocity changes are to be referenced;
(c) producing in response to the velocity error signal an increment velocity change signal representing a velocity value drived from a cosine function of a variable ranging between 0 radians and Pi radians and defining a velocity acceleration between the initial velocity and the desired velocity; and
(d) summing the base velocity signal and the increment velocity change signal to produce an increment velocity signal representing an intermediate value between the initial and desired velocity.

3. The apparatus of claim 1 wherein the input signals define a motion of the tool centerpoint requiring at least one deceleration from an increment velocity to a final velocity and the step of modifying the increment velocity signal further comprises the steps of:
(a) producing a velocity error signal representing the difference between the increment velocity and the final velocity;
(b) producing a base velocity signal representing a velocity value from which incremental velocity changes are to be referenced;
(c) producing in response to the velocity error signal an increment velocity change signal representing a velocity value derived from a cosine function of a variable having values ranging between Pi radians and 2Pi radians and defining a continuous deceleration between the initial velocity and the final velocity; and
(d) summing the base velocity signal and the increment velocity change signal to produce an increment velocity signal representing an intermediate value between the initial and final velocity.

* * * * *